United States Patent [19]

Derfler et al.

[11] Patent Number: 4,559,281

[45] Date of Patent: Dec. 17, 1985

[54] COATING FOR A SURFACE SUBJECT TO EXPOSURE TO A HIGH-FREQUENCY FIELD TO PREVENT INTERFERENCE RESULTING FROM SECONDARY ELECTRON EMISSION

[75] Inventors: Heinrich Derfler, Munich; Jurgen Perchermeier; Hermann Spitzer, both of Garching, all of Fed. Rep. of Germany

[73] Assignee: Max-Planck-Gesellschaft zur Förderung der Wissenschaften e.V., Goettingen, Fed. Rep. of Germany

[21] Appl. No.: 563,050

[22] Filed: Dec. 19, 1983

[30] Foreign Application Priority Data

Dec. 21, 1982 [DE] Fed. Rep. of Germany ....... 3247268

[51] Int. Cl.[4] ............................................ B32B 15/14

[52] U.S. Cl. .................................. 428/687; 428/671; 428/672

[58] Field of Search ........................ 428/687, 671, 672

[56] References Cited

FOREIGN PATENT DOCUMENTS 25927 1/1981 European Pat. Off. ............ 428/671

OTHER PUBLICATIONS

"Sekundäre Elektronenemission", H. Bruining–Philips' Technische Rundschau, Mar. 1938, pp. 80–87.

*Primary Examiner*—Veronica O'Keefe
*Attorney, Agent, or Firm*—Brumbaugh, Graves, Donohue & Raymond

[57] ABSTRACT

To prevent interference from secondary electron emission, a base member, as of a waveguide, which in operation is exposed to high frequency electric fields is provided with a coating comprising a rough surface layer having a thickness less than its skin depth, and a further layer of high electrical conductivity between said rough layer and said base member, the thickness of said further layer being substantially larger than its skin depth. The rough layer preferably has a ratio of mean depth to mean pitch of its random corrugations substantially larger than 1:2.

12 Claims, 1 Drawing Figure

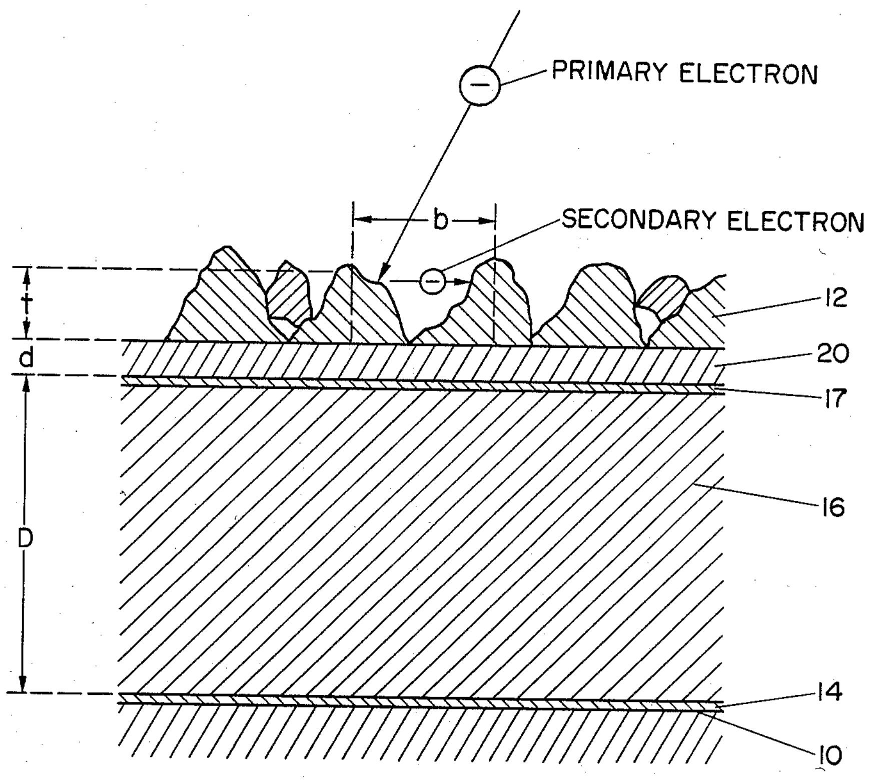
PRIMARY ELECTRON
SECONDARY ELECTRON
b
t
d
D
12
20
17
16
14
10

COATING FOR A SURFACE SUBJECT TO EXPOSURE TO A HIGH-FREQUENCY FIELD TO PREVENT INTERFERENCE RESULTING FROM SECONDARY ELECTRON EMISSION

BACKGROUND OF THE INVENTION

This invention relates to coatings for electrically conductive surface subject to exposure to a high frequency field, as for high frequency conductors, and, more particularly, to an electrically conductive coating especially adapted to prevent interference resulting from secondary electron emission and to a method for production of such coatings.

It is known that the emission of secondary electrons in electrical apparatus for high operating frequencies, such as waveguides, resonators and antennas for microwave frequencies, may cause interference even under high-vacuum conditions. If the secondary electron emission factor is greater than 1, an avalanche-like increase in the number of electrons, a so-called multiplicator discharge, may occur, leading sometimes to an undesirable total reflection of the microwave signal to be transmitted.

It is known that such interference due to secondary electron emission may be suppressed by applying a rough metal layer, which absorbs emitted secondary electrons, to the surface of the microwave conductor. With high-frequency signals of high amplitude, however, this technique is defeated by overheating of the applied rough layers because of the skin effect, and when high static magnetic fields are present, by the resulting hindrance to electron absorption. Similar problems occur with electrically conductive surfaces which are subject to exposure to a high frequency field, especially if the surfaces define a chamber which is evacuated or contains a rarified gas, e.g., the so-called first wall of a fusion reactor or the inner surface of the vacuum channel of a particle accelerator.

The object of the present invention is to provide a rough coating to a surface subject to exposure to a high frequency electric field in such a manner that it will afford a satisfactory suppression of interference due to secondary electron emission even at greater high-frequency signal amplitudes and in the presence of high static magnetic fields.

BRIEF SUMMARY OF THE INVENTION

In accordance with the invention, a coating of a surface subject to exposure to a high frequency field comprises a layer made of a metallic or semiconductive material and defining a rough surface (in short "rough layer") and having thickness substantially less than its skin depth (depth of skin effect penetration), and is provided with a further layer ("interlayer") consisting of a material of high conductivity and having a substantially greater thickness than the depth of skin effect penetration in the operating frequency range of the HF field. In particular embodiments of the invention the interlayer may contain copper, silver or gold and may have a thickness which is at least twice the depth of the skin effect penetration. In addition, a protective layer having in combination with the rough layer a thickness substantially less than the depth of the skin effect penetration may be provided between the interlayer and the rough layer to prevent oxidation of the interlayer.

The coating of the present invention may have a surface of adequate roughness, without danger of overheating due to ohmic losses in the rough surface. Preferred embodiments of the coating may also be employed in the presence of strong magnetic fields.

BRIEF DESCRIPTION OF THE DRAWING

In the following description a preferred embodiment of the invention is described by way of example with reference to the drawing which is a schematic, much enlarged, sectional view illustrating a coating prepared for a high-frequency conductor in accordance with the invention.

DETAILED DESCRIPTION OF PREFERRED EMBODIMENTS

In the typical example of the invention shown in the drawing, a portion of a surface 10, consisting of a supporting or base metal (for example iron or non-magnetic steel), of a high-frequency conductor is shown. The high-frequency conductor may be a hollow waveguide a resonator, or antenna, an electrode of a high-vacuum electron tube or the like, intended for operation at high frequencies, in particular microwave frequencies ($3\times10^8$ Hz and above).

The base member may be of solid electrically conductive material, as metal (e.g. iron or stainless steel). Alternatively the base member may comprise a body of an essentially insulating material, as plastics or ceramic, and a coating or plating of conductive material, as metal, which forms the surface 10.

The surface 10 of the high-frequency conductor is provided with an electrically conductive coating including a rough layer 12, the special parameters of which will be further discussed below. In the embodiment described, it is assumed that the rough layer 12 is made of a metal; other suitable materials are referred to later. In accordance with the invention an interlayer 16 of high electrical conductivity is arranged between the rough metal layer 12 and the surface 10, preferably with a bonding layer 14 between the surface 10 and the interlayer 16.

The thickness D of the interlayer 16 is substantially greater, at least double and preferably at least triple, than the depth of skin effect penetration at the operating frequencies of the high-frequency conductor. The depth of skin effect penetration is known to be equal to the square root of two, divided by the product of the angular frequency, the electrical conductivity and the magnetic permeability of the material in question.

The interlayer 16 should have a high electrical conductivity, i.e. a specific resistance or preferably less than $0.02\times10^{-6}$ ohm-m. Examples of suitable metals are copper, silver and gold, copper being at present preferred. The interlayer, or "conductivity layer", 16 should absorb the major portion of the eddy currents induced by the high-frequency field, and is therefore of a thickness substantially greater than the depth of skin effect penetration of the material in question.

Besides the rough metal layer 12 and the conductivity layer 16, preferably still other layers are provided. In particular, between the base metal surface 10 and the conductivity layer 16, as has been mentioned, it is expedient to provide a thin bonding layer 14, which may for example consist of nickel. Further, between the conductivity layer 16 and the rough metal layer 12, it is preferable to provide a thin protective layer 20 having the function of protecting the conductivity layer from oxidation while the rough metal layer 12 is being applied.

The protective layer 20 must be essentially free from pores and have a uniform thickness d, which should be such that the depth of penetration of skin effects for the material of the protective layer 20 is substantially greater than d throughout the layer. In particular, it is necessary that $$s = 1.6 \cdot \sqrt{\rho/\mu f} >> d,$$

where s is the depth of skin effect penetration in micrometers ($\mu$m), $\rho$ is the resistivity in $\mu$ohm-cm and $\mu$ is the magnetic permeability of the protective layer, and f is the rated operating frequency in gigahertz (GHz). When the thickness d of the protective layer is thus dimensioned, the high-frequency-induced eddy currents can penetrate practically unhindered into the underlying conductivity layer 16.

An example of a suitable material having these properties is a nickel-phosphorus alloy having a phosphorus content of more than 8.5 per cent by weight, since a phosphorous content of that magnitude increases the specific resistance of nickel significantly and eliminates the ferromagnetism of the nickel. The conductivity of the non-magnetic protective layer 20 is preferably less than $10^5$ amperes per volt-centimeter, and its thickness may for example be about 1 $\mu$m.

Suitable materials for the protective layer 20 are alloys of the transition metals Mn, Fe, Ni, Co, containing elements of Group V B of the periodic system, such as P, As, Sb, Bi, or of Group IV B such as Si, Ge, Sn, Pb, or aluminum to suppress ferromagnetism. These materials may be included in suitable electrolytes and be incorporated by electrochemical means into the transition metal alloys.

Lastly, especially if the conductivity layer 16 consists of a material other than gold, a very thin interlayer 17, which may be a gold layer of, for example 0.2 micrometers in thickness, is preferably provided between layers 16 and 20 to improve the bond between those layers and protect the underlying 16 against oxidation until the layer 20 has been applied. The gold layer 17 should be applied immediately after formation of the layer 16. The rough layer 12 may alternatively consist of, for example, a noble metal other than gold, as Ag, Rh, Pd, Ir, Pt or an alloy thereof. Gold, however, is at present preferred. Also useful are metals of the groups VIA, VA, and VIA of the periodic table, further Mn, Fe, Co, Ni, alloys thereof, and semiconductive compounds comprising elements as B, C, Si, N; still further silicon carbide, boron carbide, boron nitride, and boron silicide.

The rugosity ratio of depth t to pitch b of the rough layer is preferably 1:2 or more, and the pitch b should be smaller than the gyromagnetic radius of the secondary electrons.

The thickness t of the rough layer and the thickness d of the protective layer 20 (plus the thickness of the layer 17 if any) are preferably no greater than 1/5 of the combined depth of skin effect penetration of these layers at the operating frequency.

The coating of the present invention may be produced as follows: First the base metal surface 10 is suitably pretreated for application of the bonding layer 14, as is usual in the galvanic arts, in particular degreased and pickled. Then the thin bonding layer 14, for example of nickel, is applied, e.g. by plating, to ensure proper adhesion of the conductivity layer 16 to the base metal. The conductivity layer 16 is applied to the bonding layer 14, for example by electroplating. Preferably the thin gold layer 17 is then applied immediately to the layer 16.

The pore-free, thin protective layer 20 of uniform thickness may be applied to the conductivity layer 16, or the gold layer 17, by electrochemical reduction methods. When the above-mentioned preferred nickel-phosphorus alloy having a phosphorus content of more than 8.5 percent by weight is used as the material of the protective layer, an aqueous electrolyte solution specified in the following table may be employed.

TABLE 1

| | |
|---|---|
| Nickel chloride ($NiCl_2.6H_2O$) | 27–35 g/liter |
| Ammonium fluoride | 25–27 g/liter |
| Sodium acetate | 5–12 g/liter |
| Citric acid | 18–23 g/liter |
| Sodium hypophosphite | 6–9 g/liter |
| pH | 3.5–4.6 |

The electrochemical deposition of the nickel-phosphorus alloy is carried out preferably at a temperature in the range from about 80° to 95° C.

Instead of nickel, or in addition thereto, other transition metals such as Cr, Mn, Fe and Co may be used. Instead of a phosphorus salt, or in addition thereto if desired, compounds comprising elements of Group V B (As, Sb, Bi), Group IV B (C, Si, Ge, Sn, Pb) or Group III B (B, Al, Ga, In, Te), or the metals V, Cr, Ti, Mo may be used in order to suppress ferromagnetism, e.g. of the nickel substrate, by incorporation of said elements by chemical reduction.

The rough layer 12 is finally applied to on the protective layer 20, which protects the conductivity layer 16. In order to provide the required degree of roughness, the rate of deposition of the metal to be applied must substantially exceed the rate of two-dimensional diffusion of the metal in question along the surface, thereby preventing an ordered (epitaxial) growth of large crystals. This may in particular be achieved by depositing gold electrochemically by dipping, i.e. without electrodes, in the strong fields of statistically distributed local elements. The strong fields are formed by the electrochemical potential difference between the base metal and crystal seeds already deposited, much as in processes of corrosion. For deposition, it suffices for example to dip the conductor, precoated in the manner described, into an electrolyte of approx. 0.1 to 0.3% by weight of chloroauric acid, $H[AuCl_4].4H_2O$, pH about 2.5 to 4.5, for about 10 to 100 minutes at a temperature of about 20° to 60° C.

Instead of chloroauric acid, acids of other precious metals may be used, e.g. of silver, rhenium, palladium, iridium or platinum, and these metals may be deposited as a rough layer from electrolyte by electroplating, particularly in the case of platinum, at much elevated current density.

Platinum may, for example, be deposited from an aqueous electrolytic bath containing 2.5 to 3.5 wt. % platinum chloride and 0.2 to 0.4 g/l lead acetate at a current density of approximately 0.1 to 0.3 A/cm$^3$ and a temperature of about 20° C. for approximately 10 to 25 seconds. Other ways of producing the rough layer include vapor deposition in an inert gas atmosphere at a pressure of 0.05 to 1.0 mbar, a highly supranormal glow discharge by cathode sputtering and chemical accretion from the gaseous phase by means of an accelerated Van Arkel process.

Refractory semiconductors are also useful as materials for the rough layer 12, as compounds of the metals of the groups IVa to VIa with boron, carbon, silicon or nitrogen, and silicon carbide, boron carbide, boron nitride and boron silicide. A rough layer comprising these materials can be produced by heterogeneous catalysis or chemical vapor deposition from an atmosphere, which comprises gaseous or evaporated compounds, e.g. a halide and a hydride, which upon reaction yield the desired rough layer material. Examples of suitable mixtures of gaseous compounds for this purpose comprise a compound of a metal of group IVa to VIa, specifically a halide thereof, and a compound of one of the elements boron, carbon, silicon and nitride, as a hydride thereof. The mixture may also comprise an additive gas, as $CO_2$, $SO_2$ or $H_2S$ which impeeds or prevents the epitaxial crystle growth and secures the desired roughness. The rough layer may be deposited from such an atmosphere by heating the substrate comprising the conductivity and protective layers to a sufficiently high temperature. In addition, a gas discharge may be produced in the atmosphere to accelerate the deposition rate.

For example, a suitable rough layer of semiconductive titanium carbide may be produced by a modified heterogeneous catalysis or chemical vapor deposition method, wherein the structure to be provided with the rough layer is heated to a temperature of about 800° to 1000° C. and is subjected to an atmosphere of atmospheric pressure which consists essentially of a stoichiometric mixture of methane ($CH_4$) or other gaseous or vaporized hydrocarbons, and titanium tetrachloride ($TiCl_4$). The mixture preferably comprises an additive gas of the type mentioned above with a partial pressure of some millibars.

A modification of the above method which can be performed with lower temperatures comprises the step of placing the structure to be coated in a vacuum container which is evacuated and then filled with a stoichiometric mixture of methane (or another hydrocarbon gas or vapor) and titanium tetrachloride with a pressure of about $10^{-2}$ millibar to about some millibars. Preferably, an additive gas of the above mentioned type is included with a partial pressure of about $10^{-3}$ to about $10^{-5}$ millibar. The structure to be coated is heated to the temperature of about 200° C. and a glow discharge is produced between an anode provided in the vacuum container and the structure to be coated which is connected as cathode. The glow discharge in combination with the elevated temperature of the structure promotes the chemical reaction between the hydrocarbon and the titanium tetrachloride at the surface to be coated, whereby titanium carbide grows on the surface in the form of the desired rough layer.

A further method of producing the rough layer of any of the following refractory semiconductor silicon carbide, boron carbide, boron nitride and boron silicide, and compounds comprising metals of Groups IV A to VI A and B, C Si, N, consists in depositing these on the protective layer (20) from a suspension in an electrolyte of Mn, Fe, Ni, Co or Cr by a combination of electrolysis and cataphoresis at voltages of about 30 V and current desities of 100–500 A/m². Alternatively, deposition of said particles can be performed simultaneously with the deposition by chemical reduction of Mn, Fe, Ni, Co or Cr. The particle size is preferably 1 μm or less. A typical concentration of such a suspension is about 0,5 to 1,0 kg per liter.

The use of a rough layer of refractory and mechanically most resistant materials is of specific advantage, if the coating is subject to high thermal loading and other stresses, such as particle bombardment as in the case of the so-called first wall of a fusion reactor and, to a lesser degree, of the electrodes of a particle accelerator.

In order to capture a sufficiently large fraction of the secondary electrons, which are generally emitted with a mean emission energy of about 2eV, inside the rough layer, the process parameters should be so controlled that the rugosity ratio of depth t to pitch b is greater than or equal to about 1:2. If the capture of the secondary electrons is to be ensured even in the presence of strong magnetic fields, the pitch b must be smaller than the gyromagnetic radius of secondary electrons at the emission energy. The gyromagnetic radius r, in micrometers, for the above specified mean emission energy, is approximately 3.4/B, where B is the magnetic field strength in teslas.

After the conductor surface 10, which may be part of a waveguide, antenna, or the like, has been furnished with the multilayer coating in the manner described above, it is preferably subjected to a final heat treatment in an inert gas atmosphere or under high vacuum, for example for several hours at 350° to 600° C., to consolidate the transitions from layer to layer by intermetallic diffusion. This ensures a smooth transition of the thermal and eddy currents generated by the high frequency signals.

Finally, the coating may advantageously be stabilized by "spot knocking". The simplest way to do this is to subject the conductor, when first placed in service, to a number (e.g. 50) of brief high-frequency pulses of such high voltage that field emission of electrons, passing over immediately into short-term thermal electron emission, will take place at the peaks of abnormally high or loose crystals of the rough metal layer.

A preferred embodiment of the present coating had the following parameters:

| | |
|---|---|
| Base metal 10 | austenitic steel |
| Bonding layer 14 | nickel, thickness approx. 0.1–0.3 micron |
| Conductivity layer 16 | copper, thickness, D = 10–15 microns |
| Gold layer 17 | approx. 0.2 micron |
| Protective layer 20 | nickel, alloyed with 9–12 wt. % phosphorous, thickness d = 0.8–1.3 micron |
| Rough metal layer 12 | gold, mean rugosity pitch b = 0.8–1.3 micron, mean depth t = 1.5–3 microns |

Allowable magnetic field 0–3 teslas (30 kgauss)
Operating frequency range 0.5 to 5 GHz
Allowable power rating output of a rectangular waveguide in this frequency range, 0.3 to 3 megawatts for pulse lengths under 5 seconds and internal residual gas atmosphere pressures under $10^{-3}$ mbar.

The mean secondary emission coefficient (number of primary electrons relative to number to secondary electrons, measured at residual gas pressure of $10^{-4}$ mbar $H_2$) for a coating of the kind specified above and approximately the following values.

TABLE 2

| Energy of Primary Electrons, eV | Secondary Emission Coefficient 0° Angle of Incidence (normal) | 80° Angle of Incidence (grazing) |
|---|---|---|
| 100 | 0.33 | 0.33 |
| 300 | 0.42 | 0.42 |
| 600 | 0.49 | 0.49 |
| 800 | 0.49 | 0.51 |
| 1000 | 0.49 | 0.51 |
| 1400 | 0.49 | 0.51 |
| 2000 | 0.48 | 0.50 |

We claim:

1. An electrically conductive coating for the surface of a base member which in operation is exposed to high frequency fields, said coating preventing interference resulting from secondary electron emission and comprising an outer layer having a rough surface and a thickness less than the skin depth penetration of the coating at said high frequencies and a further layer of high electrical conductivity between the outer layer and the base member and having a thickness substantially greater than the skin depth penetration of said coating at said high frequencies.

2. A coating according to claim 1 wherein the further layer contains a metal of high conductivity selected from the group consisting of copper, silver and gold.

3. A coating according to claim 1 wherein the thickness of the further layer is at least double the depth of the skin effect penetration.

4. A coating according to claim 1 including a protective layer between the interlayer of high conductivity and the rough layer.

5. A coating according to claim 4 wherein the material and the thickness of the protective layer are selected so that the depth of skin effect penetration is substantially greater than the thickness of the protective layer.

6. A coating according to claim 4 wherein the sum of the thickness of the protective layer and the thickness of the rough metal layer is no more than one-fifth of the depth of skin effect penetration of the combination of the two layers at the operating frequencies of the electric conductor.

7. A coating according to claim 1 wherein the rugosity ratio of depth to pitch of the rough layer is at least 1:2.

8. A coating according to claim 1 wherein the rugosity pitch of the rough layer is less than the gyromagnetic radius of the secondary electrons the presence of a magnetic field at the coated surface of the waveguide.

9. A coating according to claim 1 wherein the protective layer (20) consists of an alloy comprising at least one transition metal (Mn, Fe, Ni, Co) and at least one element of Group V B (P, As, Sb, Bi), Group IV B (C, Si, Ge, Sn, Pb), Group III B (B, Al, In, Ga, Te) or one of the metals V, Cr, Ti, Mo.

10. A coating according to claim 1 wherein the rough layer contains at least one of the materials from the group consisting of Ag, Au, Th, Pd, Ir, Pt, a metal of groups IV A, V A and VI A of the periodic system, Mn, Fe, Ni, Co, alloys thereof, silicon carbide, boron carbide, boron nitride, semiconductor compounds comprising B, C, Si, N.

11. A coating according to claim 1 wherein the interlayer consists of copper, the protective layer consists of a nickel-phosphorus alloy having a phosphorus content of more than 8.5 Wt. % and the rough metal layer consists of gold.

12. A coating according to claim 4 wherein a thin gold layer is interposed between the interlayer and the protective layer.

* * * * *